(No Model.) 4 Sheets—Sheet 1.
F. G. SARGENT.
MACHINE FOR WASHING WOOL OR SIMILAR FIBERS.
No. 452,501. Patented May 19, 1891.
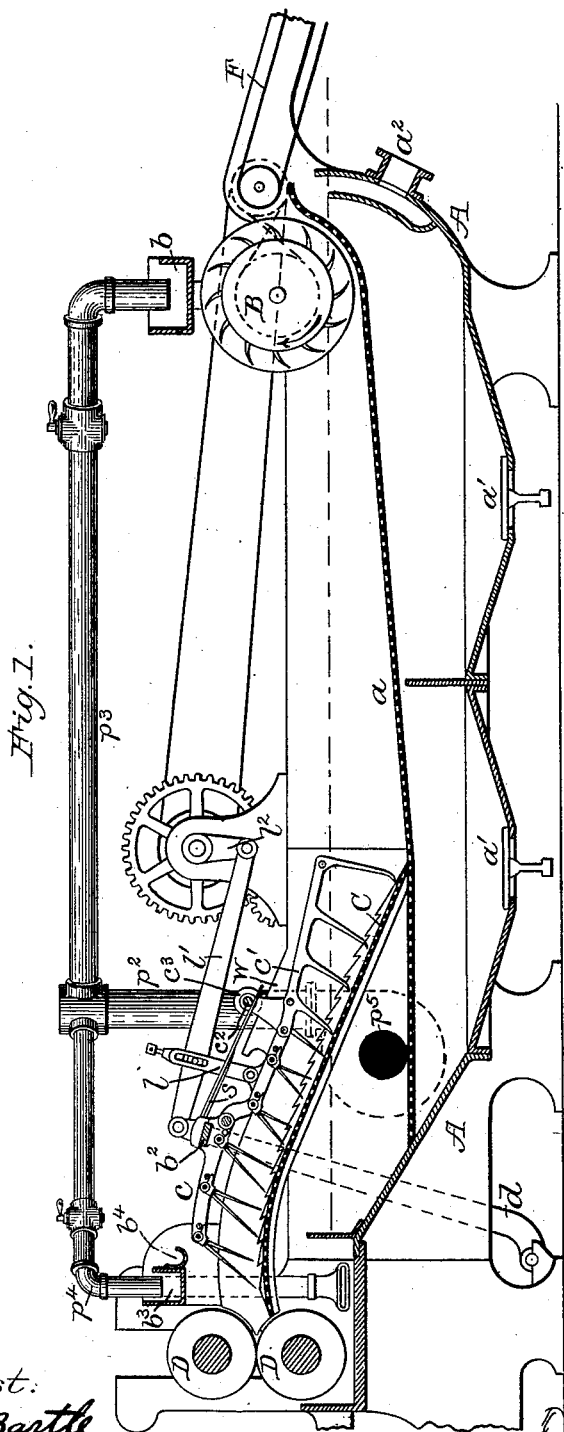
Attest:
Howell Bartle
Alex. Scott
Inventor:
Frederick G. Sargent
By Philip F. Larner
Associate Attorney

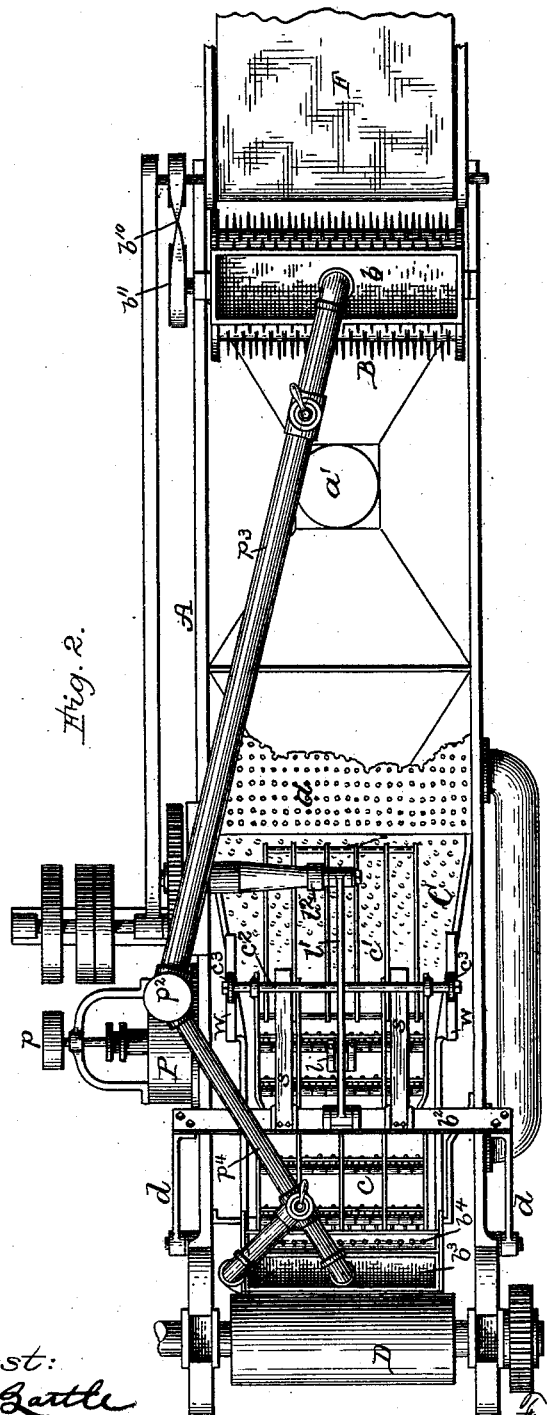

(No Model.) 4 Sheets—Sheet 3.
F. G. SARGENT.
MACHINE FOR WASHING WOOL OR SIMILAR FIBERS.
No. 452,501. Patented May 19, 1891.
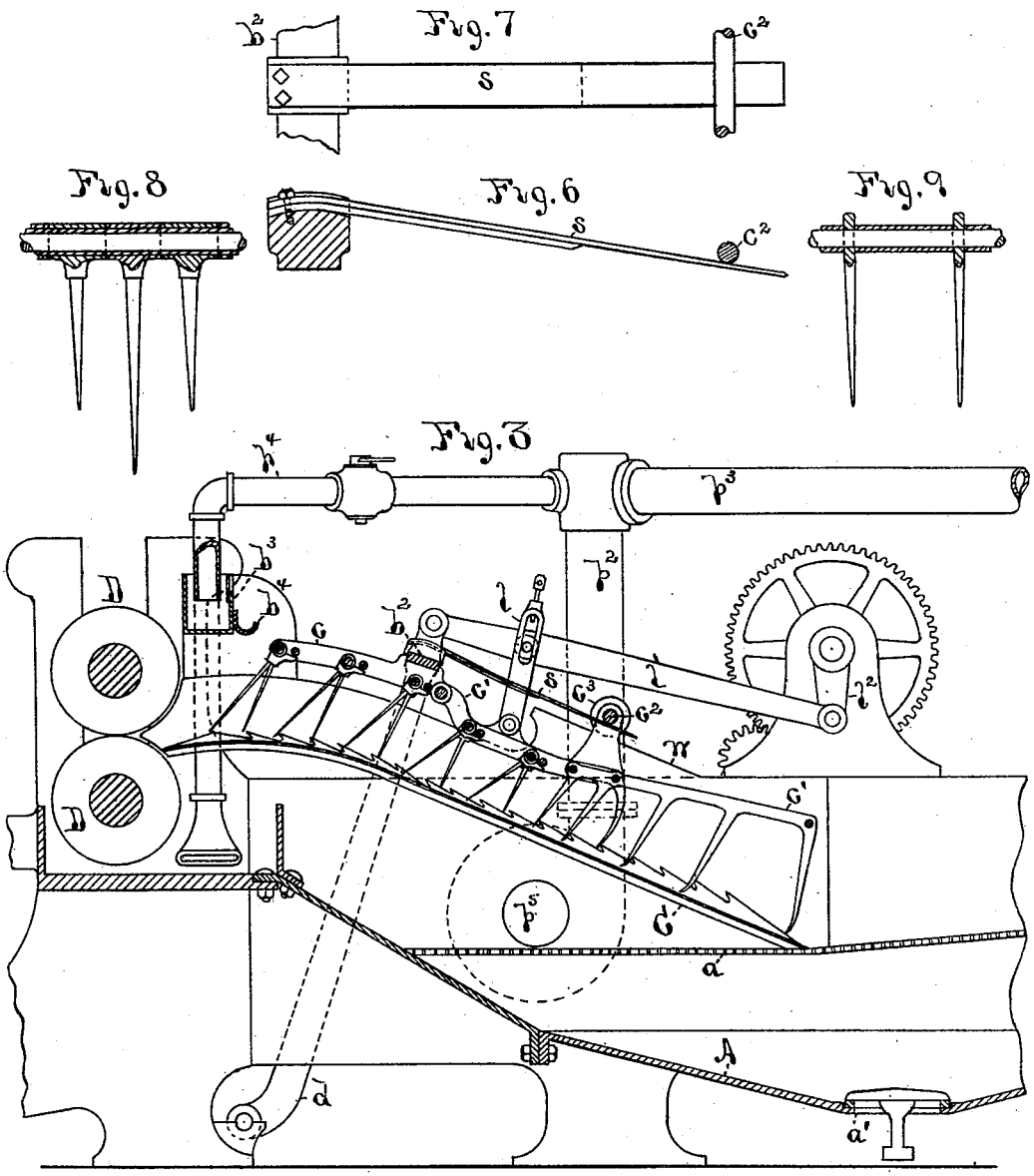

(No Model.) 4 Sheets—Sheet 4.
F. G. SARGENT.
MACHINE FOR WASHING WOOL OR SIMILAR FIBERS.
No. 452,501. Patented May 19, 1891.
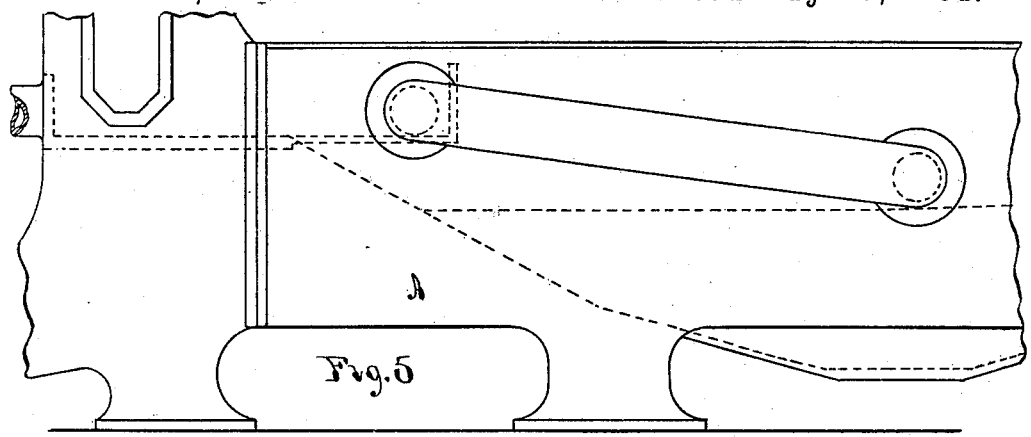
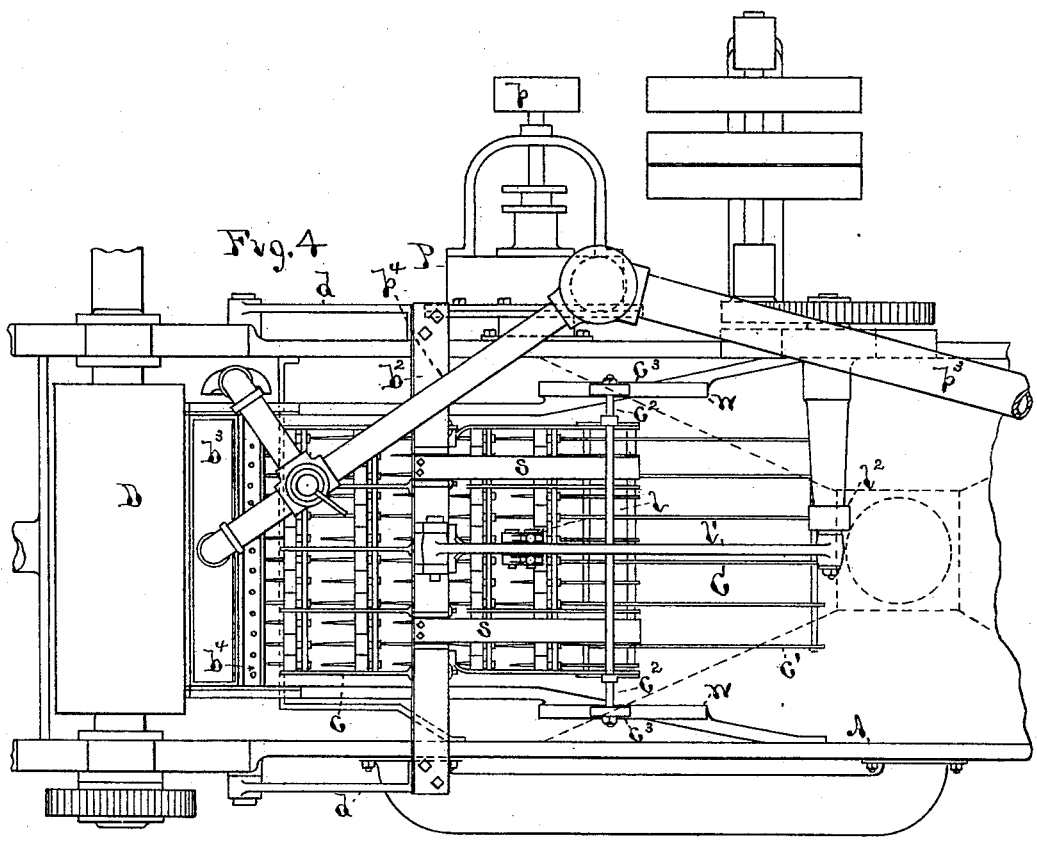
Witnesses  
Inventor  
Frederick G. Sargent  
By David Hall Rice  
Atty.

UNITED STATES PATENT OFFICE.

FREDERICK G. SARGENT, OF GRANITEVILLE, MASSACHUSETTS.

MACHINE FOR WASHING WOOL OR SIMILAR FIBERS.

SPECIFICATION forming part of Letters Patent No. 452,501, dated May 19, 1891.

Application filed September 10, 1887. Serial No. 249,391. (No model.)

*To all whom it may concern:*

Be it known that I, FREDERICK G. SARGENT, of Graniteville, in the county of Middlesex and Commonwealth of Massachusetts, have invented a certain new and useful Improvement in Machines for Washing Wool or Similar Fibers, of which the following is a specification.

My invention relates to machines for washing wool or similar fibers; and it consists in certain new and useful constructions and combinations of the several parts of the same, substantially as hereinafter described and claimed.

In the drawings, Figure 1 is a longitudinal central section of a wool-washing machine made vertically. Fig. 2 is a top plan view of the machine. Fig. 3 is an enlarged view of the end of Fig. 1 nearest the squeeze-rolls for the purpose of showing the details of construction of the several parts. Fig. 4 is a similar enlarged view of the same end of Fig. 2. Fig. 5 is a side elevation of the part of the bowl shown in Fig. 4 with the operating mechanism removed therefrom. Figs. 6, 7, 8, and 9 are enlarged views of parts of the mechanism detached from the machine, some of the parts in Figs. 8 and 9 being sectioned to show details of construction.

A is the frame and casing of the machine, constructed in the form of a bowl, with standards for supporting the working parts in the usual manner. This bowl has a perforated false bottom $a$ and waste-pipes or openings and overflow-pipe $a'$ $a'$ and $a^2$. A feed-apron F is attached to the bowl in the usual manner to feed the wool into the same. From this the wool is delivered to the cylinder B, which revolves in the direction indicated by the arrow. This cylinder is made with teeth or pins projecting therefrom in such a direction as to prevent the wool and the grease it contains dropping downward into the bowl until carried around underneath the cylinder.

Directly over the cylinder B is the showering-trough $b$, placed in such a position that its overflow shall shower or drench the wool before it has been submerged in the washing-liquid contained in bowl A. For this purpose the edge nearest to apron F is made lowest to permit the proper overflow of the drenching-fluid.

On one side of the bowl is attached the rotary pump P, driven by pulley $p$. Leading upward from this is the pipe $p^2$, and a branch pipe $p^3$ conducts the drenching-fluid into the trough $b$, as shown. As the drenching-fluid overflows from the latter upon the wool, the pins or teeth of cylinder B sustain the fiber and prevent its being washed off and allow it to be well drenched as it is being delivered into the fluid of the bowl and before it has reached the latter, thus effectively washing out and separating heavy dirt, which, if soaked with the wool and the grease it contains in the fluid of the bowl first, does not separate therefrom so readily and is liable to be squeezed through and discolor the fiber of the wool by the squeeze-rolls when it reaches them. The backward inclination of the teeth of cylinder B tends to cause them to leave the wool more readily after it is carried underneath the cylinder, as well as hold it while being drenched. After leaving cylinder B the wool is carried forward by the usual forks to the bed C of the carrier; but these forks and their driving mechanism have been omitted from the drawings for the sake of clearness and because their construction and operation is well understood, they forming no part of my present invention.

The carrier which carries the wool up the inclined bed C to the squeeze-rolls D D is formed of the main part $c$, which is attached to the pivoted arms or levers $d$ on each side of the machine, and is provided with pivoted teeth projecting downwardly, which swing forward and pass over the wool on the backward movement of the carrier, in the manner shown in the patent granted to Ackroyd October 14, 1873, No. 143,603. To the backward end or side of carrier $c$ is pivoted the supplemental carrier $c'$, which is lifted on the backward movement of the carrier by the link $l$, connected to the pitman-rod $l'$. This pitman-rod is pivoted at one end to a stud on top of carrier $c$ and at the other is attached to the wrist-pin of crank $l^2$, which drives it. Figs. 8 and 9 show the manner in which the teeth are attached to the cross-bars of the carrier. In general construction this carrier is similar to that patented to me upon the 28th day of March, A. D. 1876, No. 175,258; but I have made the following improvement upon it:

Upon the sides of the bowl, below the pitman, I attach ways $w$ $w$, parallel on their upper surface to the carrier-bed C. Across the supplemental carrier $c'$ I attach shaft $c^2$ in brackets, the ends projecting over the ways. Upon these ends are fixed rollers $c^3$ $c^3$ in such a position that when the supplemental carrier $c'$ is dropped upon the wool preparatory to its forward movement the rollers will rest upon the ways $w$ and guide the supplemental carrier thereon. To accomplish this, I make the link $l$ with an elongated slot to receive the pin attaching it to pitman $l'$ and arrange the slot and pin so that during the movement of crank $l^2$ the pin can move longitudinally in the slot. This arrangement enables me to give a more desirable form to the surface of the carrier-bed C than heretofore. I am also enabled to take the wool up by the carrier as it is left upon the lower end of the inclined carrier-bed by the last preceding fork more effectively than by the mechanism shown in my former patent. It is well understood that the function of the supplemental carrier $c'$ is to rise over the bunches of wool as left by the fork at the lower end of the inclined bed, whereas after the wool begins to be advanced by the carrier up the inclined bed it is not necessary and is undesirable for the carrier to rise over that part of it which is spread out and has its bunches broken up, it being understood, of course, that the wool is advanced up the carrier-bed and spread out in a step-by-step movement by the repeated reciprocation of the carrier. The supplemental carrier, therefore, acting in combination with the main carrier $c$, only lifted up over the wool where it was necessary, while the main carrier was not lifted, and thus prevented from doing its work most effectively. It was found, however, in some instances and with certain kinds of wool that when the supplemental carrier dropped upon the wool the latter tended to bunch up and roll under the carrier-teeth, owing to the supplemental carrier being of so light weight, and thus the carrier failed to convey and spread it along the carrier-bed, as is desirable. By experimenting I have discovered that this was due to the form of the bed at its lower end, combined with the fact that the light weight of the supplemental carrier caused it to rest upon the points of its teeth on the fiber when dropped upon it, and that by sustaining the carrier after dropping, as described, upon a bed of the form here shown the difficulty was overcome, because the play or space between the lower ends of the supplemental carrier-teeth and the bed tended to draw the wool out instead of rolling it up, and I am thus enabled to gain all the advantage of lightness in the supplemental carrier with the most effective work, it not being necessary to provide so much weight to drive its teeth into the fiber as it drops.

In order to relieve the shock which the rollers $c^3$ $c^3$ and ways $w$ might receive from the dropping of the supplemental carrier, as described, I connect to a bar $b^2$ on top of carrier $c$ two flat steel springs, which project horizontally backward under shaft $c^2$ and sustain a portion of the weight of the supplemental carrier. These springs are lettered $s$ $s$.

Above the carrier-bed C and carrier is located the drenching-trough $b^3$, which is made to overflow on its rear side farthest from the feed-rolls by having that edge made lower than the others. A branch pipe $p^4$ from pipe $p^2$ supplies it with drenching-fluid. Both branches $p^3$ and $p^4$ are provided with shut-off cocks, as shown. The trough $b^3$ overflows into a supplemental or additional basin or pan $b^4$, made of curved metal and perforated, as shown in Fig. 2, and this serves to spread or shower the overflowing liquid over the wool more effectively, while the trough prevents the perforations from clogging up by allowing the dirt to settle to its bottom and be retained. It may also be found expedient to employ the machine without rakes, as shown in the drawings, in some cases, as the showering-fluid delivered from trough $b$ flows toward the carrier with a constant current, being taken up by pump P through the outlet-pipe $p^5$. This outlet-pipe is located above the level of the false bottom $a$, and the latter is slightly inclined downward toward it to facilitate the transportation of the wool from the cylinder B to carrier-bed C by the current of washing fluid, which is accomplished with considerable rapidity.

I do not limit my invention to the precise form of feeding-in mechanism shown, as it is evident that other forms may be employed which are equivalents of this in carrying the wool through the space over the fluid in bowl A and under the drenching apparatus and afterward downward into the fluid in the bowl without departing from the spirit of my invention.

Instead of employing two springs $s$ $s$ to sustain the supplemental carrier, it is obvious that one of them may be dispensed with and the other used alone, if preferred.

What I claim as new and of my invention is—

1. The combination of the bowl A, formed and arranged to receive and soak the fiber while floating and suspended in the fluid contained therein, the cylinder B at the feed-in end of the bowl, placed above the washing-fluid in the latter and provided with retaining-teeth arranged to receive and suspend the fiber thereon above the washing-fluid and to carry it downward and deliver it from them into the latter to be soaked, and the spraying or drenching mechanism located above the point where the teeth receive the fiber and arranged to drench the same while suspended thereon and before being carried down into the soaking-fluid, substantially as described.

2. The combination of the bowl A, formed and arranged to receive and soak the fiber while floating and suspended in the fluid contained therein, the cylinder B at the feed-in end of the bowl, placed above the washing-fluid in the latter and provided with retaining-teeth curving upward and backward, arranged to receive and suspend the fiber thereon above the washing-fluid and to carry it downward and deliver it from them into the latter to be soaked, and the spraying or drenching mechanism located above the point where the teeth receive the fiber and arranged to drench the same while suspended thereon and before being carried down into the soaking-fluid, substantially as described.

3. The combination, in a fiber-washing machine, of the carrier-bed C, the carrier $c$, mounted upon supports above the same and arranged to travel back and forth parallel, or nearly so, thereto, the supplemental carrier $c'$, pivoted to the rear side of carrier $c$ and provided with rollers $c^3 \, c^3$, the ways $w \, w$ beneath the latter, and mechanism adapted to lift the supplemental carrier on its rearward movement and allow it to descend and travel upon said ways during its forward movement, substantially as described.

4. The combination, in a fiber-washing machine, of the carrier-bed C, the carrier $c$, mounted upon supports above the same and arranged to travel back and forth parallel, or nearly so, thereto, the supplemental carrier $c'$, pivoted to the rear side of carrier $c$, an elastic support attached to the latter and supporting supplemental carrier $c'$, and mechanism adapted to lift the weight of the supplemental carrier off of said elastic support partly or wholly on its rearward movement and allow it to descend again upon said support during its forward movement, substantially as described.

5. The combination, in a fiber-washing machine, of the carrier-bed C, the carrier $c$, mounted upon supports above the same and arranged to travel back and forth parallel, or nearly so, thereto, the supplemental carrier $c'$, pivoted to the rear side of carrier $c$ and provided with rollers $c^3 \, c^3$, the ways $w \, w$ beneath the latter, an elastic support $s$, attached to carrier $c$ and supporting supplemental carrier $c'$, and mechanism adapted to lift the supplemental carrier on its rearward movement and allow it to descend and travel upon said ways during its forward movement, substantially as described.

6. The combination, in a fiber-washing machine, of the carrier-bed C, extending above the level of the fluid in bowl A, the carrier $c$, the pipe $p^4$, overflow-trough $b^3$, and the supplemental perforated pan $b^4$, arranged to receive the overflow from the upper edge of said trough and further divide the same into jets or streams during its descent upon the fiber, substantially as described.

FREDERICK G. SARGENT.

Witnesses:
ARTHUR B. PLIMPTON,
LeROY J. CHERRINGTON.